US012691417B2

(12) United States Patent
Serra Alfaro et al.

(10) Patent No.: US 12,691,417 B2
(45) Date of Patent: Jul. 28, 2026

(54) METHOD FOR PRODUCING A GAS SEPARATION MEMBRANE

(71) Applicant: Kerionics, S.L., València (ES)

(72) Inventors: José Manuel Serra Alfaro, València (ES); Isaac Herráiz Cardona, València (ES); Juan Usó Vaillanueva, Almazora (ES); Juan Carlos Gallart Pedro, Almazora (ES); Francisco José Ferrando Soliva, Almazora (ES)

(73) Assignee: Kerionics, S.L., València (ES)

( * ) Notice: Subject to any disclaimer, the term of this patent is extended or adjusted under 35 U.S.C. 154(b) by 776 days.

(21) Appl. No.: 17/902,405

(22) Filed: Sep. 2, 2022

(65) Prior Publication Data

US 2022/0410077 A1 Dec. 29, 2022

Related U.S. Application Data

(63) Continuation of application No. PCT/ES2021/070158, filed on Mar. 4, 2021.

(30) Foreign Application Priority Data

Mar. 4, 2020 (ES) ............................... ES202030189

(51) Int. Cl.
*B01D 67/00* (2006.01)
*B01D 53/22* (2006.01)
(Continued)

(52) U.S. Cl.
CPC ..... *B01D 67/00415* (2022.08); *B01D 53/228* (2013.01); *B01D 67/00411* (2022.08);
(Continued)

(58) Field of Classification Search
CPC .............. B01D 53/228; B01D 67/0041; B01D 67/00411; B01D 67/00415;
(Continued)

(56) References Cited

U.S. PATENT DOCUMENTS 7,364,813 B2 * 4/2008 Sugawara ........... H01M 4/8828
429/441
2007/0131609 A1 6/2007 Ramaswamy et al.
(Continued)

FOREIGN PATENT DOCUMENTS

WO 2008/133718 A2 11/2008
WO 2014/187978 A1 11/2014
WO 2019/106344 A1 6/2019

OTHER PUBLICATIONS

Badalov, et al., "Ink-jet printing assisted fabrication of patterned thin film composite membranes," J. of Membrane Sci., 493:508-514 (Year: 2015).*

(Continued)

*Primary Examiner* — Patrick Orme
(74) *Attorney, Agent, or Firm* — Boyle Fredrickson, SC

(57) ABSTRACT

The present invention relates to a method for producing ceramic gas-separation membranes, which comprises depositing, by means of inkjet printing, water-based inks that form layers of a gas separation membrane. More specifically, the method comprises at least the following steps forming a porous support (i) compatible with a functional separation layer; depositing on the support (i), by means of inkjet printing, at least one functional separation layer (ii) formed by at least two inks, and depositing at least one porous catalytic activation layer (iii) on the functional separation layer (ii); and performing at least one heat treatment, which produces sintering. The functional separation layer (ii) is deposited in a manner to produce a surface with fadings, patterns, or combinations thereof. The invention also relates to a gas separation membrane produced using the described method.

25 Claims, 6 Drawing Sheets

(51) Int. Cl.

| | |
|---|---|
| *B01D 69/02* | (2006.01) |
| *B01D 69/10* | (2006.01) |
| *B01D 71/02* | (2006.01) |

(52) U.S. Cl.
CPC ........... *B01D 69/02* (2013.01); *B01D 69/105* (2013.01); *B01D 69/108* (2022.08); *B01D 71/02* (2013.01); *B01D 71/0271* (2022.08); *B01D 2323/18* (2013.01); *B01D 2323/216* (2022.08); *B01D 2323/21823* (2022.08); *B01D 2325/02* (2013.01); *B01D 2325/027* (2013.01); *B01D 2325/04* (2013.01); *B01D 2325/08* (2013.01); *B01D 2325/10* (2013.01)

(58) Field of Classification Search
CPC .. B01D 67/0083; B01D 69/02; B01D 69/105; B01D 69/108; B01D 71/02; B01D 71/024; B01D 71/0271; B01D 2323/18; B01D 2323/216; B01D 2323/21823; B01D 2325/02; B01D 2325/04; B01D 2325/08; B01D 2325/10; B28B 11/048; B41J 2/01; C04B 41/0072; C04B 41/89; C09D 11/30
See application file for complete search history.

(56) References Cited

U.S. PATENT DOCUMENTS

| | | | | |
|---|---|---|---|---|
| 2017/0100697 | A1* | 4/2017 | Serra Alfaro | B01J 23/755 |
| 2019/0207227 | A1* | 7/2019 | Kelsall | H01M 4/8832 |

OTHER PUBLICATIONS

Gao, et al., "A Method for the Efficient Fabrication of Multifunctional Mosaic Membranes by Inkjet Printing," Am. Chem. Society Applied Material Interfaces, 8:19772-19779 (Year: 2016).*

International Search Report mailing date Apr. 29, 2021; Application No. PCT/ES2021/070158—(8) pages.

Domenico De Meis; "Microporous Inorganic Membranes for Gas Separation and Purification"; Research and Development / Porous Ceramics; 67th Volume; Apr. 2018 Interceram; pp. 16-21 (6) pages.

Bernardo et al.; "Membrane Gas Separation: A Review/State of the Art"; Ind. Egn. Chem. Res., vol. 48, 4638-4663 No. 10, 2009; Published on Web Apr. 22, 2009—(26) pages.

Escolástico et al.; "Hydrogen separation in La5.5WO11.25-δ membranes"; Journal of Membrane Science 444 (2013) 276-284; journal homepage: www.elsevier.com/locate/memsci; 2013 Elsevier B.V.—(9) pages.

Ivanova et al.; "Hydrogen separation through tailored dual phase membranes with nominal composition BaCe0.8Eu0.2O3-δ:Ce0.8Y0.2O2-δ at intermediate temperatures"; Published Nov. 4, 2016; Scientific Reports | 6:34773 | DOI: 10.1038/srep34773—(4) pages.

Xueliang Dong et al.; "Dense ceramic catalytic membranes and membrane reactors for energy and environmental applications"; 10886 Chem. Commun., 2011, 47, 10886-10902; www.rsc.org/chemcomm—(17) pages.

Huixia Luo et al.; "CO2-Stable and Cobalt-Free Dual-Phase Membrane for Oxygen Separation"; Angew. Chem. Int. Ed. 2011, 50, 759-763; © 2011 Wiley-VCH Verlag Gmbh & Co. KGaA, Weinheim; www.angewandte.org—(5) pages.

Bram et al.; Inkjet Printing of Microporous Silica Gas Separation Membranes, Journal of the American Ceramic Society, Jan. 8, 2015, vol. 98, No. 8, pp. 2388-2394, ISSN 0002-7820 (print); ISSN 1551-2916 (electronic), <DOI: doi: 10.1111/jace.13657>; Abstract and paragraph "Experimental procedure"—(7) pages.

Van Gestel et al.; Synthesis and characterization of hydrogen-selective sol-gel SiO2 membranes supported on ceramic and stainless steel supports, Separation and Purification Technology, Jan. 14, 2014, vol. 121, pp. 20-29, ISSN 1383-5866 (print), <DOI:doi:10.1016/j.seppur.2013.10.035>; Abstract, paragraph: "Ink-jet printing of SiO2 microporous layers"—(10) pages.

* cited by examiner (ii)

(iv)

(i)

(iii)

(ii)

(iv)

(i)

METHOD FOR PRODUCING A GAS SEPARATION MEMBRANE

CROSS-REFERENCE TO RELATED APPLICATIONS

This application claims priority to and is a continuation of PCT Application No. PCT/ES2021/070158, filed Mar. 4, 2021, which, in turn, claims priority to Spanish Application No P202030189, filed Mar. 4, 2020, the entire contents of each application is incorporated herein by reference

FIELD OF INVENTION

The present invention belongs to the field of gas separation membranes. Specifically, it refers to the manufacturing method using inkjet technologies for gas-permeable membranes based on ceramic materials. The invention also provides the configuration of the membrane and its use in different applications in the energy sector and chemical process industry. In the case of the use of mixed electronic and ionic conductive ceramic materials, the use of the membrane is mainly oriented towards oxidation and oxy-combustion processes wherein a flow enriched in oxidant (oxygen) is used to obtain high flame temperatures, to improve the combustion or to avoid contact of $O_2$ or $N_2$ with the products of the industrial oxidation process wherein the membrane is used. An example is the use in oxy-combustion power plants wherein the flue gases can be used as carrier streams in the membrane module. This concept of thermal power plant makes it possible to reduce $CO_2$ and NOx emissions to a minimum.

BACKGROUND OF THE INVENTION

Currently, there are many decoration systems used in the manufacture of ceramic coatings and floor tiles that provide ceramic surfaces with certain aesthetic properties: screen printing, intaglio printing, flexography, gravure printing, etc.; however, there are numerous characteristics of digital inkjet printing technology (also called inkjet) that make it especially interesting for this purpose. This application process has its beginning in the years 1999-2000 with the introduction in the sector of the first digital printer that used soluble inks, which were formulated from organic complexes of metals.

In recent years, decoration processes of ceramic surfaces using digital printing systems such as inkjet have gained great importance, not only to increase the aesthetic properties of decorations, but also to provide other properties that until now were impossible to achieve with the rest of the decoration techniques.

The main advantages of inkjet systems are: the absence of contact between the applicator and the surface to be printed, avoiding raw breaks and defects caused by friction; the high resolution of the image; the reduction in the number of operations to be carried out during the printing process; the easy obtaining of personalized products; the economy of the process, both in small and large batches; and the great versatility of the technology by allowing the printing of any topography that the piece shows. The above advantages position inkjet technology as an ideal decoration method to increase the added value of ceramic substrates, a key aspect in the manufacture of traditional ceramics, which has been possible thanks to the great evolution that technology has undergone. in all areas: machinery, heads, software, inks, ink preparation processes, etc . . . .

Regarding the machinery and heads, there has been considerable progress: from the first heads used that allowed a deposition of less than 10 g/m$^2$ of material and limited the particle size of the solids ($D_{99}$) around 1 µm, until today, that we can have high deposition heads, around 100 g/m$^2$ per bar, in which an ink with solids can be used at a $D_{99}$ of up to 3 µm, for piezoelectric heads, and 20 µm, for valve heads.

There has also been an evolution regarding the type of printing that can be done with the heads. Initially, a binary printing mode was used, which over time changed to gray-scale mode, and today it can be deposited even in high droplet size mode.

Ink development has come a long way in the direction of including solids in the ink formulation. In this sense, different types of inkjet inks have been developed that are characterized by the use of inorganic pigments, inorganic raw materials and/or frits as a solid component, that provides the desired aesthetic effect, and organic solvents as a liquid component.

There are many inkjet ink formulations on the market prepared from combinations of different organic solvents such as esters, glycol ethers, hydrocarbons, etc. Their use is due to the fact that they give the ink low evaporation speeds, so that they have little tendency to dry out in the heads, which are usually at temperatures between 30-50° C. and have a Newtonian behavior required to be able to be applied with high definition heads.

As far as the present invention is concerned, the layer of ink that must be deposited on the support to form the membrane is of the order of 30 µm once sintered, that is, 6 times greater than that currently applied for decoration. of ceramic tiles. This high thickness of ink to be deposited makes it difficult to use inks formulated with the solvents mentioned above. This is due to the fact that they have a very slow evaporation temperature and also a very high decomposition temperature, which causes very long drying times for the piece and the appearance of defects in the fired layer.

For this reason, work has been done on formulating the necessary inks using water and water-miscible liquids such as glycols, as liquids. In this way, the novelty in the formulation of inks lies in the use of inorganic compounds of a ceramic nature as solid components and in the use of water and glycols and/or mixtures of both as liquid components.

From the application point of view, the novelty of the present invention resides in the use of digital printing technology to carry out the deposition of the developed water-based inks that make up the layers of a gas separation membrane. It is understood that the necessary modifications to the configuration and position of the heads, adapting them to the different geometric shapes of the membranes to be coated, are evident to a person skilled in the art.

According to their structural characteristics, inorganic membranes capable of gas separation can be divided into two categories, which can have a significant impact on their performance as separators and/or reactors: dense membranes and porous membranes.

The latter are characterized by the presence of pores or voids that may be straight through the thickness of the membrane or may be interconnected with high tortuosity, which is directly influenced by the preparation method. Both dense and porous membranes can be deposited on porous supports, with the purpose of reducing the thickness of the membrane and increasing the mechanical resistance. When the separation layer and the designed support have a homogeneous structure and composition in the direction of the membrane thickness, they are called symmetrical membranes (they also take this name when they are self-supported, that is, there is no porous support). Alternatively, if the membrane layer and the support structure have different microstructures and/or compositions, they are referred to as asymmetric membranes.

The main characteristics of the different types of gas separation membrane used are detailed below:

a) Porous inorganic membranes: These types of membranes include: (1) mesoporous membranes (25 nm>pore radius>2 nm), which present Knudsen-type separation at high temperature and which is proportional to $(M_1/M_2)^{0.5}$, where $M_1$ and $M_2$ are the molecular weights of the species to be separated; and (2) microporous membranes (pore radius <1 nm), where the separation depends on the size and shape of the pore, the interaction between the molecules and the pore surface.

In silica membranes, the separation is mainly achieved thanks to the sieving effect that occurs through irregular pores defined mainly by six connected $SiO_2$ tetrahedra with an average size of approximately 3 Å. Currently, the interest in this type of membranes is focused on the separation of $H_2$ and pervaporation, where it is possible to simultaneously achieve high flux and selectivity values (in operation at temperatures between 20° and 600° C.), although they present serious stability problems of the materials under hydrothermal conditions.

Membranes based on zeolites, which by definition are microporous crystalline aluminosilicates composed of $TO_4$ wherein T=Si, Al with primary tetrahedral units with oxygen atoms connecting the neighboring tetrahedra, are garnering considerable interest due to their extraordinary hydrothermal stability and potential to achieve high selectivities and $H_2$ permeation values at working temperatures between 20° and 600° C. The main drawback of these membranes is the reduction in permeability and selectivity values caused by microstructural imperfections and the difficulty in reducing the thickness of the membrane.

The present invention solves this stated problem since membranes are achieved that do not have imperfections and the thickness is more controllable.

b) Dense metal membranes for hydrogen separation: Many metals have high hydrogen permeability, particularly the transition metals of groups IV, V and Pd. For example, hydrogen transport across Pd membranes can be divided into different steps: (1) diffusion of hydrogen to the metal surface of the membrane on the feed side; (2) adsorption of hydrogen on the surface; (3) dissociation of hydrogen molecules and incorporation into the metal; (4) diffusion of the protons in the structure and of the electrons in the electronic bands; (5) regeneration of hydrogen molecules on the permeate side; (6) desorption of the hydrogen molecule; (7) diffusion of the hydrogen molecule from the surface, assuming a porous support. The flow of hydrogen is strongly limited by the thickness of the membrane. Therefore, research efforts are focused on the development of the deposition of thin layers of Pd (and its alloys) on a porous support, which confers the required mechanical resistance. Pd alloys increase $H_2$ permeation and prevent the phenomenon of hydrogen embrittlement. Some of the materials used in the alloys are Ru, Rh, Ni, Cu and Ag.

c) Dense ionic ceramic membranes: These types of membranes are based on mixed ionic conductors, which are capable of simultaneously transporting electrons and ions through their structure, or on mixtures of two types of crystalline phases, one that transports predominantly ions and the other one transporting predominantly electrons or electron holes. Within the constituent materials of these membranes we can find: (1) ionic oxygen conductors: they conduct oxygen ions compensated by the transport in the opposite direction of electrons and, (2) protonic conductors: they are capable of transporting protons through their structure, and electroneutrality is achieved by conducting electrons and, in some cases, oxygen ions. The advantage of this type of membranes over the previous ones is that they have infinite permselectivity.

The present invention describes a method for the manufacture of membranes based on digital inkjet printing. It has been discovered that using this technology it is possible to manufacture functional layers with a configuration that maximizes gas permeation, given the improved diffusivity of the gas to be separated through said structured functional layers. In the case of membranes based on mixed ionic and electronic conductors, porous interlayers can also be introduced that allow maximizing the catalytic activity for gas exchange, so that the total permeability of the membrane is improved. Likewise, this technology, thanks to the unique combination and structuring of various materials during digital printing, makes it possible to improve the chemical stability of the membrane against interaction and degradation in operation with industrial gases.

Next, the mechanism of operation of two types of membranes based on ionic conductors is offered in greater detail: (a) protons, for the separation of hydrogen; (b) of oxygen ions, for the separation of gaseous oxygen. Likewise, examples of constituent materials and industrial processes that can accommodate the technology based on ceramic membrane modules are provided:

(a) Dense Ionic Ceramic Membranes for Hydrogen Separation

Hydrogen separation can be carried out using membranes whose functional layer is a dense layer composed of ceramic materials capable of conducting protons through their crystal lattice at high temperatures (300-1000° C.).

If the membrane only has proton transport capacity and not electronic carriers capacity, the separation can be carried out by applying an electrical potential between both sides of the membrane. On the other hand, if the membrane possesses proton and electron transport capabilities, the driving force for separation may be a pressure gradient or chemical potential gradient. There are few materials reported as mixed conductors of electrons and protons, and in all cases there is a notable deficiency both, in ambivalent conductivity $(\sigma_{ion} \cdot \sigma_{el})/(\sigma_{ion} + \sigma_{el})$ and in stability against reaction with $CO_2$ to produce carbonates. The known materials with the best mixed conduction properties are: $BaCe_{0.9}Yb_{0.1}O_3$, $La_6WO_{12}$ and $Ca_{0.05}Nd_{0.95}NbO_4$. Another alternative with greater potential is the use of mixtures of materials (composite materials or composites) that have, separately, high electronic conductivity and high proton conductivity, and present, as a whole, high thermochemical stability and compatibility. (Reference: T. Scherb et al. *Journal of Membrane Science* 444 (2013) 276-284). Examples of said composites are the combinations $Ce_{0.8}Eu_{0.2}O_{2-\delta}$ with $BaCe_{0.8}Eu_{0.2}O_{3-\delta}$; or $Ce_{0.8}Y_{0.2}O_{2-\delta}$ with $BaCe_{0.8}Y_{0.2}O_{3-\delta}$, as electronic and proton conductors, respectively. (Reference M. E. Ivanova et al, Scientific Reports 6 (November 2016) 34773).

The hydrogen transport mechanism in mixed proton conductors comprises a sequence of elementary steps (FIG. 5.*a*). In the first place, the adsorption of water in the vacancies of the crystal lattice is necessary to form OH species in different positions of the same, and the transport of the protons is carried out by means of the jump of the proton to neighboring oxygens. The flow of protons is accompanied by a flow of electrons or electronic holes in the same direction. The superficial oxidation/reduction and hydrogen dissociation processes are catalyzed by noble metals and other metals (generally highly sensitive to the presence of sulfur compounds) and ceramic materials in the form of nanometric particles.

This type of membrane allows hydrogen to be separated from gaseous streams such as hydrocarbon reforming, with theoretical selectivities of 100% with respect to CO and $CO_2$.

(b) Dense Ionic Ceramic Membranes for Oxygen Separation

The non-porous functional separation layer (ii) in this type of dense ceramic membranes is generally composed of a mixed conductor material for electrons and oxygen ions in the solid state, including alkaline earth elements, rare earth elements and transition metals in its crystal structure, such as iron and cobalt. These oxides have oxygen deficiency in their structure and, thanks to these oxygen vacancies in their network, the diffusion mechanism of the oxygen ion through the crystalline structure is possible. The materials most currently used for this application have a perovskite-type crystal structure, with compositions such as $La_{0.6}Sr_{0.4}Fe_{0.8}Co_{0.2}O_{3-\delta}$ or $Ba_{0.8}Sr_{0.8}Fe_{0.2}Co_{0.8}O_{3-\delta}$. However, the great problem with this type of material is its low stability because it is subjected to oxygen concentration gradients for long periods of time and, mainly, because it is subjected to the presence of $CO_2$ under operating conditions, generally producing carbonates of alkaline earth elements (carbonation phenomenon). With regard to membranes made up of two types of crystalline phases, one that predominantly transports oxygen ions and the other that predominantly transports electrons or electronic holes, it has recently been reported that the combination of gadolinium-doped cerium oxide with a cobalt-free spinel and alkaline earth metals, such as $Fe_2NiO_4$, has given rise to a promising material in terms of its activity for oxygen separation (J. Caro et al., *Angewandte Chemie International Edition* 2011, 50, 759).

In the dense layer of ceramic membranes, the oxygen transport (and separation) phenomenon occurs in the following consecutive stages, outlined in FIG. 5.*b*: Initially, molecular oxygen ($O_2$) is adsorbed on the membrane surface and is then reduced and dissociated to form atomic species of adsorbed reduced oxygen.

The adsorbed oxygen ion ($O^{-2}$) is incorporated into an oxygen vacancy in the crystal lattice and diffuses via jumps to neighboring positions of oxygen vacancies in the lattice. This diffusion of the anion is accompanied by a counter diffusion of electrons in the opposite direction. Finally, the oxygen ions are oxidized and recombined into molecular oxygen at the other interface of the membrane, and finally the O2 is released and incorporated into the permeate stream.

The intracrystalline transport of oxygen demands temperatures above 650° C., and the balance of charges produced by the transport of electrons or oxygen vacancies requires that the material possess sufficient electronic conductivity under the operating conditions of the membrane. The driving force responsible for transporting oxygen across the membrane is the difference in partial pressure of oxygen between the two sides. of the membrane. This pressure gradient can be achieved by applying a vacuum on the permeate side of the membrane or by using a stripping gas.

Thus, the flow of oxygen through a membrane is determined by the temperature and the partial pressure difference of oxygen, in addition to the thickness of the membrane.

Another crucial step in the oxygen separation process in ion transport membranes is gas exchange. The different stages of transport can be limiting and can produce a decrease in the permeation flux through the membrane. Among the different possible reasons we can highlight the following: (1) the thickness of the selective separation layer is very small, therefore diffusion through the solid is much faster than gas exchange. Typically, this critical dimension is called "characteristic length" and is the ratio between the diffusion coefficient and the kinetic constant of the superficial gas exchange reaction under the operating conditions and gas composition in contact with the membrane surface; (2) The membrane surface has no appreciable catalytic activity for the oxygen activation reaction; (3) The gaseous atmospheres in contact with the surface or surfaces of the membrane disfavor the adsorption/desorption of molecular oxygen and its evolution through the $O_2+2e^- \leftrightarrow O^{-2}$ reaction.

The ceramic oxygen separation membranes are assembled in modules that can be fed from the residual heat generated in industries with thermal processes of combustion or oxidation. In particular, the simulations carried out on the integration of this technology in oxy-combustion processes indicate a global energy efficiency of the plant that is much higher than that currently achieved with conventional oxygen supply technologies. Oxycombustion consists of injecting a stream of high purity $O_2$ as an oxidant into the furnace burners instead of air, as is done in conventional combustion processes, thus reaching higher flame temperatures with less fuel consumption, and thus achieving higher performance. The use of oxygen-rich oxidants makes it possible to obtain combustion gases with a composition consisting mainly of $CO_2$ and water vapour. The high concentration of $CO_2$ in the exhaust gases in the oxy-combustion process facilitates its potential separation. Therefore, this method has the advantage of facilitating the separation and capture of $CO_2$, which can be subsequently liquefied, transported and stored or used in other industrial processes. This combustion process concept allows $CO_2$ and NOx emissions to be reduced to a minimum, as well as substantially increasing the energy efficiency of the method. Examples of intensive industries in the use of energy that use oxygen, are the glass industry, incinerators, manufacture of frits, enamels and colorifices, metallurgy, iron and steel, chemical industry, refining and petrochemical industries. One of the industrial sectors wherein the use of oxygen makes oxy-combustion possible is the melting of glass and the manufacture of frits, glazes and ceramic colours. In this type of industry, the need to reach temperatures above 1500° C. inside the furnaces, in order to melt the mixture of raw materials that is introduced, is achieved by using oxygen instead of air in the natural gas burners.

Oxygen membranes can also be applied in air enrichment, such that the oxygen concentration is increased from 21% to higher values, typically above 24%. This increase in concentration is necessary in certain combustion or chemical conversion processes wherein the calorific power of the product to be treated, generally a fuel, is insufficient to maintain adequate operating conditions. A typical example of enrichment is use in cement plants that use alternative fuels or incinerate waste during clinker manufacture.

Oxycombustion aims to be one of the most economical technologies for capturing $CO_2$, its main drawback being its high demand for $O_2$ and the cost involved in obtaining it. The great challenge of this technology lies in the production of $O_2$ in order to supply the high quantities that are required. Currently, the only technologies available on an industrial scale capable of producing large volumes of $O_2$ are cryogenic distillation of air and absorption facilities in solid absorber columns (PSA-VPSA), the latter with lower production capacities and, generally, with oxygen purities less than 95% by volume. The drawback of cryogenic distillation of air is its high energy consumption. In the case of a thermal power plant, this consumption can reach 15% of its electricity production, penalizing the overall efficiency of the plant by 10%. Therefore, the technology of dense ceramic membranes based on oxygen ion conductors is postulated as a particularly interesting alternative with which it is expected to reduce the overall efficiency loss in the oxycombustion plant to 5%, with a theoretical oxygen purity of 100%.

Among the publications that describe types of gas separation membranes in general, we can mention: *Ind. Eng. Chem. Res.* 2009, 48, 10, 4638-4663 Apr. 22, 2009. Membrane Gas Separation: A Review/State of the Art:
https://pubs.acs.org/doi/full/10.1021/
ie8019032?src=recsys Publications describing porous gas separation membranes include: *Interceram-International Ceramic Review, July* 2018, Volume 67, Issue 4, pp 16-211 *Microporous Inorganic Membranes for Gas Separation and Purification:*
https://link.springer.com/article/10.1007/s42411-018-0023-2.

Publications describing dense gas separation membranes include: Chemical Communications 39,2011. Dense ceramic catalytic membranes and membrane reactors for energy and environmental applications:
https://pubs.rsc.org/en/content/articlelanding/2011/cc/
c1cc13001c #!divCitation

BRIEF DESCRIPTION OF THE INVENTION

Advantages of Inkjet Technology for the Deposition of Functional Layers in Ceramic Gas Separation Membranes The present invention relates to a new method for manufacturing ceramic membranes using, among others, the inkjet technique, so that improved configurations and functionalities can be obtained. Therefore, it provides a solution to improve the gas separation membrane manufacturing method, as well as its performance (permeate flow) under industrial operating conditions and, consequently, overcome the drawbacks of the state of the art; also using materials that have high chemical stability and high performance in gas separation. Specifically, the digital inkjet application of the functional electroceramic layers makes it possible to: (a) reduce thickness, fine-tune the microporous structure of the system and improve its final performance, thanks to 0 high resolution; (b) the application on non-flat supports and with reliefs, improving the design and functionality of the device, and minimizing the number of defective parts since it is a non-contact deposition, (c) the automation of the production method, and (d) the manufacturing in environmentally friendly conditions, by allowing the use of water-based inks.

DESCRIPTION

The dense (non-porous) or porous gas separation membranes of a ceramic nature (such as the examples described in the background section, in a) and c) that are obtained according to the method of the present invention, comprise, for their practical use, the following basic configuration consisting of at least the following components:

A porous support (i), compatible with a separating functional layer, wherein compatible means that both components-support and functional layer-present a similar expansion profile as a function of temperature and that no reaction takes place between both phases at high temperatures (800-1500° C.) to give rise to third phases, which generally produce degradation and rupture of the membrane.

at least one functional separating layer, dense or porous, located on the porous support made up of 2 or more inks, (ii).

That the materials present a similar expansion profile means that they dilate (expand and contract) in an aligned way to avoid cracks, breaks, bendings (buckling) or other defects, in the final membranes. If two materials do not have the same thermal expansion or expansion profile, then their bond is unstable and the assembly breaks during heating or cooling.

Additionally, the membranes prepared by the method of the invention may comprise the following layers, among others:

(iii) A porous catalytic layer, deposited on the functional separation layer (ii), which allows improving the processes of incorporation and elimination of gaseous products, (iv) A porous interlayer, deposited between the porous support (i) and the functional separation layer (ii), which has the objective of improving the gas exchange stages, especially when the porous support (i) does not have catalytic activity nor does it allow ion transport to take place.

The basic membrane architecture comprises layers (i) and (ii) (FIG. 1). The geometry of the membrane in the final module can be flat, tubular or any other complex geometry that improves the performance of the module, that is, thermofluid dynamics, resistance to pressure, heat exchange and proper sealing of the system.

According to a further embodiment, a membrane prepared by the method of the invention comprises layers (i), (ii), (iii) and (iv) in the sequence order (i), (iv), (ii) and (iii) (FIG. 2). Generally, the properties of layer (ii), (iii) and (iv) are quite similar, although in general the specific surface area of layers (iii) and (iv) is considerably higher than that of layer (ii).

According to an additional embodiment, optionally, in a membrane prepared by the method of the invention, another layer called compositional damping porous interlayer, (v), located between the support (i) and the catalytic porous layer (iv), may also be necessary, as an intermediate link that absorbs the compositional change, favoring the deposition and stability of the next layers, as shown in FIG. 3.

According to a particular embodiment, another additional non-porous layer (vi) may be necessary in a membrane prepared by the method of the invention. This layer is located between the functional separation layer (ii) and the porous catalytic activation layer (iii), and serves to protect layers (ii) and (iii) against possible interactions or degradation reactions in contact with the layer (iii) or with the operating gases in contact with layer (ii) (FIG. 4). The additional non-porous layer (vi) must allow ionic and electronic transport, while being thermo-chemically compatible with the adjacent layers and with the gases with which it is in contact.

FIG. 4 shows a schematic of a membrane in which the architecture and sequence between (i), (ii), (iii), (iv), (v) and (vi) are presented.

Of the possible constituent layers of the membrane obtained by the method of the invention:

layer (ii) can be dense or porous, layers (iii), (iv) and (v) are always porous, layer (vi) is dense.

In this specification, the expression "sintered layer" refers to each of the constituent layers of a membrane in its final state, that is, as it is obtained after the applications of the corresponding inks and a thermal treatment that produces sintering at a minimum temperature of at least 600° C. in the case of some layer, such as layer (iii), and porous membranes, or 800° C. in the case of dense membranes.

Thus, the present invention refers to a method for the manufacture of ceramic gas separation membranes that comprises the deposition on a porous support (i); by inkjet technique of at least one functional separating layer (ii) consisting of at least two inks, and at least one heat treatment, which produces sintering of the layer.

The present invention refers, more specifically, to a method for the manufacture of ceramic gas separation membranes that comprises, at least, the following stages:

(a) forming of a porous support (i) compatible with a functional separation layer (ii), (b) deposition on the support (i), by means of the inkjet technique, of at least one functional separation layer (ii) consisting of at least two inks and deposition of at least one porous layer of catalytic activation (iii) on the functional separation layer (ii) and (c) at least one thermal treatment, which produces sintering, in which the functional separation layer (ii) is deposited in a way that gives rise to a surface:

with fadings with patterns, or with combinations of both.

"Compatible" means that both components-support and functional layer—have a similar expansion profile as a function of temperature and that a reaction between the two phases does not take place at high temperatures to give rise to third phases, which generally produce defects and/or or rupture of the membrane.

The term "fading" here has its usual meaning, that is, a smooth or progressive transition effect between different colors, or also a smooth transition effect in a scale of shades of the same color, such as a gray scale.

The fading can be obtained in an image, that is, two-dimensional, 2D. When using several inks, there is a "drawing-pattern" on the surface (2D) for each pass or application of ink. If one also wants to have a pattern in the plane perpendicular to the surface (3D), one has to make more than one pass or application of ink. For this purpose, the texture (rheology) of the inks must be similar. After sintering, each ink can evolve differently and it is possible that the "sintered layer" has different textures or reliefs at the point where they are applied.

The term "pattern" refers to any type of image or drawing, with geometric patterns with repeating geometric shapes, such as a 2D chessboard with interconnectivity of phases in section, fractal pattern, spiral pattern and combinations thereof.

"Interconnectivity of phases in section" means that, by making a cut in the thin membrane, or in any of the layers that compose it, it can be seen that the crystalline phases—which may be separated at the surface level—are connected among them in the inside.

It is possible to obtain a fading or pattern by depositing the inks in such a way that different geometries are obtained. For example, when using the inkjet printing technique, by depositing the inks, causing the print heads to follow a predetermined movement, the desired geometry is obtained.

According to particular embodiments, step b) of the method comprises deposition of at least one fluid layer made up of at least two inks that covers—without leaving ink-free gaps—a complete area of the surface of the porous support (i), and so that the two inks are simultaneously applied.

Step b) of the method further comprises a step of deposition of at least one porous catalytic activation layer (iii) on the functional separation layer (ii). The technique used for the deposition of layer (iii) on the functional separation layer (ii) can be selected from among dip coating, spin coating, roller coating or screen printing; physical vapor deposition, sputtering, electron beam, atomizing; airbrushing; nebulizing (spraying) of suspensions; and/or thermal spraying, including plasma spraying and spray pyrolysis; 3D printing, stereolithography, inkjet, inkjet printing and combinations thereof, preferably inkjet.

According to another particular embodiment, step b) of the method further comprises an additional step in which a porous catalytic layer (iv) located between the porous support (i) and the functional separation layer (ii) is deposited. The technique used for the deposition of layer (iv) between the porous support (i) and layer (ii) can be selected from among the techniques cited above for the preparation of layer (iii). Preferably the technique for depositing the porous catalytic layer (iv) is inkjet printing.

According to another particular embodiment, step b) of the method further comprises another step in which a porous compositional damping porous interlayer (v) is deposited between the functional separation layer (ii) and the porous catalytic layer (iv). The technique used for the deposition of layer (v) between the functional separation layer (ii) and the porous catalytic layer (iv) can be selected from the techniques cited above for the preparation of layer (iii) or (iv), and, preferably, the technique for depositing the compositional damping porous interlayer (v) is inkjet.

According to another particular embodiment, step b) of the described method may also comprise the deposition of another additional non-porous layer (vi) (FIG. 4). This layer (vi) is intended for the particular case of membranes based on dense separation layers (ii) made of mixed ionic-electronic conductors. This layer (vi) is located, if present, between the functional separation layer (ii) and the porous catalytic activation layer (iii), and serves to protect layers (ii) and (iii) against possible interactions or degradation reactions in contact with layer (iii) or with the operating gases in contact with layer (ii). The additional non-porous layer (vi) must allow ionic and electronic transport, while being thermo-chemically compatible with the adjacent layers and with the gases with which it is in contact. This layer is usually more stable and with lower ionic conductivity than the functional separation layer (ii), which implies that its thickness must normally be less.

The technique used for the deposition of the additional non-porous layer (vi) between the functional separation layer (ii) and the porous catalytic activation layer (iii), can be selected from the techniques mentioned above for the preparation of the layer (iii) or (iv), and is preferably inkjet.

According to a further embodiment, a membrane prepared by the method of the invention comprises layers (i) and (ii) and one or more of layers (iii), (iv), (v) and/or (vi).

Each optional layer that may be part of the membrane, for example, layer (iii), (iv), (v) and/or (vi) can be deposited in a way that gives rise to a pattern, fading or combinations of them, different from the patterns or fading, or combinations obtained or foreseen for the remaining layers.

According to a particular embodiment of the method described above, in step b), in each application of each of the layers (ii), (iii), (iv) and (v) and/or (vi), at least 2 different inks are used, in this way the desired patterns and/or fading are obtained.

According to particular embodiments, step b) of the method comprises a single application or identical applications of the inks that make up the layer or layers of the membrane ("identical applications" are those that maintain the drawing or pattern of the application previously made), that is that is, layer (ii) and, optionally, any of layers (iii), (iv), (v) and/or (vi). In this case, after a thermal treatment, the fading or pattern obtained gives rise to a distribution of the different crystalline phases and/or a porosity distribution, for example, between a 2D chessboard, mosaic with interconnectivity of phases in section, fractal pattern, spiral pattern and combinations thereof.

According to an additional particular embodiment, step b) of the method comprises the deposition of inks following a pattern of different applications ("different applications" are those that give rise to a drawing different from the drawing or pattern of the previous application). In this case, a different pattern is obtained in each application of ink in layers (ii), (iii), (iv) and (v) and/or (vi) after a thermal treatment, and a 3D gradient is obtained through along the z axis (perpendicular to the printing plane), with geometry, for example, based on pyramidal patterns, conical patterns or based on regular pore systems such as those found in zeolites or coordination polymers (MFOs-metal organic framework).

According to additional particular embodiments, step b) of the method comprises the deposition of inks with different applications that give rise to fadings or patterns that comprise areas with different porosity in the same layer or from one layer to another.

According to additional particular embodiments, step b) of the method comprises the deposition of inks following the model of different applications (as defined above) that give rise to fadings or patterns that comprise areas with different ionic and/or electronic conductive capacity.

These zones may be in the form of, for example, individual lines, grids, segments, mosaics, spirals and/or pillars.

According to additional particular embodiments, step b) of the method comprises the deposition in certain areas of inks that comprise two or more different ionic conductors.

According to particular embodiments, step c) of the method comprises a heat treatment at a temperature of at least 800° C. (minimum temperature for a layer to sinter), for example, at temperatures between 850 and 1650° C.

Optionally, it is possible to carry out a heat treatment after each application of ink on each of the layers mentioned above.

Preferably, the heat treatment is carried out only after depositing a complete layer and not after one or several applications or "passes" with inks.

At least one heat treatment of one layer of the membrane must be capable of producing sintering of said layer.

In addition, an intermediate heat treatment, e.g. drying, between about 50-120° C. in air, may be necessary.

Regardless of whether heat treatments have been carried out during the production of the membrane, at least one final heat treatment is always necessary. This treatment is, for example, typically carried out in air or in an inert gas in the maximum temperature range during the treatment between 80° and 1650° C., with heating and cooling ramps, for example, between 3 and 15° C./min.

How a heat treatment is carried out depends on the furnace, the load, among other parameters. A heat treatment according to the invention can be carried out by any known technique, preferably, it can be selected from treatment in an electric oven, gas oven, induction oven, microwave treatment, laser treatment or combinations thereof. It is normally carried out in an electric or gas oven, in which heat transfer is carried out mainly by radiation and convection.

The heat treatments after each ink application can be carried out in a conventional manner, for example, in a temperature range between 80° and 1650° C. (preferably between 1000 and 1500° C.), with a heating ramp that depends on the type furnace, load and other parameters.

According to a particular embodiment, the porous catalytic activation layer (iii) is deposited after having carried out at least one heat treatment, and, after its deposition another heat treatment is applied again. These treatments (for layer (iii)) can be carried out in the temperature range between 60° and 1100° C., in order to have greater control over the size, pore morphology and connectivity between them According to the method of the present invention, the shaping of the porous support (i) can be carried out by a technique selected from among uniaxial or isostatic pressing, extrusion or calendering, tape casting, conventional casting, dip coating), spin coating, roller coating or screen printing, physical vapor deposition, sputtering, electron beam, suspension spraying, and/or projection thermal spraying, including plasma spraying and spray pyrolysis; 3D printing, stereolithography, inkjet, inkjet printing and combinations thereof, preferably, uniaxial pressing, extrusion, calendering, inkjet and combinations thereof.

According to preferred embodiments, the shaping of the porous support (i) is carried out in such a way as to obtain a porous support (i) with a porosity between 10 and 60% with respect to the total volume of the support, measured by the method of saturation of pores with liquid based on Archimedes' principle, preferably, between 30 and 50%, and a thickness of less than 2.5 mm, preferably, between 0.1 and 2 mm.

The constituent materials of the porous support (i) used, which must be resistant to high temperatures, such as sintering temperatures, and mechanically and chemically compatible with the constituent materials of the functional separation layer (ii), can be selected, for example, among magnesium oxide, aluminum and magnesium spinels, cerium oxide doped with at least one lanthanide metal, zirconium oxide doped with at least one of the following elements: Y, Mg, Se or a lanthanide metal; titanium oxide, aluminum nitride, refractory alloys/superalloys, materials containing crystalline phases including clays or aluminum silicates, magnesium silicate, iron silicate, titanium silicate or silicates of alkali or alkaline earth elements, iron perovskites and combinations thereof, preferably, magnesium oxide, doped cerium oxide, doped zirconium oxide, magnesium silicates, and iron perovskite.

In addition, according to a particular embodiment of the method for obtaining ceramic membranes, it may comprise a heat treatment stage at temperatures between 60° and 1200° C. (specific for the porous support) after shaping the porous substrate (i), with the purpose of eliminating the organic matter present in the deposited layers, and to sinter and chemically connect the ceramic particles to each other.

Sintering in this context means thermally compressing through high temperature recrystallization mechanisms, thus, this is achieved by heat treating at the proper temperature. The heat treatment after the initial shaping of the porous substrate (i) is optional, but in the end all the inks must have undergone at least one heat treatment, which is necessary to activate and structure the inks.

Preferably, the functional separation layer (ii) of the method described in the present invention has a thickness of less than 50 μm, preferably between 2 and 50 μm, and more preferably between 2 and 30 μm.

In particular, for the constitution of the functional separation layers (ii)—both dense and porous—it is necessary to deposit a minimum of two inks of different composition that comprise, at least:

a) an inorganic solid, b) a liquid component and c) a conditioning additive (such as dispersants, preservatives, binders, surfactants, etc.).

In the case of dense membranes, the constituent inorganic solids of layer (ii) are always crystalline solids.

Layer (ii) in the case of dense membranes can comprise a mixture of 2 or more inorganic solids (crystalline phases). In a typical example, functional layer (ii) is dense and has 2 crystalline phases with different conductivities, one is ionic conductivity and the other one electronic conductivity.

In the manufacturing of dense ionic ceramic membranes for gas separation membranes, the minimum ionic conductivity of functional layer (ii) is 1 mS/cm and the minimum electronic conductivity is 5 mS/cm at a temperature of 850° C.

According to a particular embodiment, in the manufacture of dense ionic ceramic membranes for gas separation, the functional separation layer (ii) is a non-porous layer, wherein the inorganic solids (a) of the inks can be selected from:

those that give rise to conductive layers of the oxygen ion, conductors of protons or conductors of the hydride anion ($H^-$), carbonate ion conductors, conductors of alkali metals, n or p type electronic conductors, and combinations thereof, preferably, layers conducting oxygen ions, protons, n or p type electronic conductors and combinations thereof.

Some of these solids are solids that, once sintered, give rise to a majority crystalline phase selected from fluorite, perovskite, spinel, pyrochlore, and combinations thereof.

According to a particular embodiment, in the manufacture of porous inorganic gas separation membranes, the functional separation layer (ii) is a porous layer, wherein the inorganic solids (a) of the inks can be selected so as to obtain porous functional layers (ii) selected among ceramic porous matrices with selectivity to $H_2$, CO, $O_2$, water, hydrocarbons (such as methane) and combinations of the same. According to particular embodiments, these solids are based on en $SiO_2$, $TiO_2$, $ZrO_2$, $Al_2O_3$, SiC, $Nb_2O_3$, silico-aluminates (zeolites), MgO, carbon and combinations thereof.

In the case of porous membranes, no clear crystalline phases are formed and they are known as amorphous microporous membranes-except for zeolitic membranes.

In a particular preferred embodiment, once the functional separation layer (ii) has been deposited, it is subjected to a heat treatment (sintering) between 80° and 1500° C., which gives rise to a layer with a thickness of less than 30 μm, sintered and chemically connected with the underlying layers. In the case of porous membranes, the minimum sintering heat treatment temperature may be 600° C.

According to a preferred embodiment, a heat treatment is carried out after depositing a complete layer, instead of carrying out a treatment after one or several applications or "passes" with inks.

According to the present invention, each of the inks used for layers (iii), (iv) and (v) comprises at least:

(c) a liquid component, and (d) a conditioning additive AA; (such as dispersants, preservatives, binders, surfactants, etc.), and optionally comprises (a) an inorganic solid SO, (b) a fugitive additive, AF, which is a compound that decomposes during the sintering step, giving rise to the desired porous structure, or comprises both (a) and (b).

Components (c) and (d) are always present in the formulation of each of the constituent inks of layers (iii), (iv) and (v), while components (a) and (b) may be present both at the same time or only one of them, that is, the fugitive additive (b) can be mixed in the ink that contains the inorganic solid (a), or it can constitute a new ink together with the liquid component and the conditioning additive(s).

Preferably, the fugitive additive comprises materials selected from graphite, starch, polymethylmethacrylate (PMMA), cellulose, PVA (polyvinyl alcohol), PVB (Polyvinyl Butyral), nylon, ammonium bicarbonate and combinations thereof, preferably PMMA and graphite, with particle sizes selected between 0.1 and 5.0 μm, preferably between 0.1 and 3.0 μm. These fugitive additives are commercial products.

The fugitive additive is a pore former, generally a polymeric, carbonaceous, vegetable or similar solid. This additive is used to give porosity to porous layers. This fugitive additive is not a conditioning additive.

The fugitive additive (b) can be removed with a heat treatment between 40° and 1100° C. According to a particular embodiment, the fugitive additive (b) can be eliminated with a heat treatment between 40° and 1100° C., with heating and cooling ramps between 3 and 15° C./min.

According to the present invention, in the case of dense ionic ceramic membranes, each of the inks used for the additional non-porous layer (vi) comprises at least:

a) an inorganic solid, b) a liquid component, and c) a conditioning additive (such as dispersants, preservatives, binders, surfactants, etc.).

The inorganic solids (a) of the inks of the additional non-porous layer (vi) are selected from the same inorganic solids that constitute the functional separating layer (ii).

The chemical composition of the layers comprises, for example, metal oxides, metal oxides doped with different elements, so that the crystalline phases have the desired structure, as explained for the majority crystalline phase in layers (ii), (vi), etc.

According to particular embodiments, each of the layers (ii), (iii), (iv), (v) and (vi) after sintering comprises at least 2 different inorganic crystalline phases, they are selected from fluorite, perovskite, spinel, pyrochlore and combinations thereof.

In the method of the invention, the solid component of the inks is present in a weight percentage between 20 and 55%, preferably between 25 and 45% with respect to the total weight of the ink.

As described in the present invention, in the cases wherein the porous layers (iii), (iv) and (v) described above are deposited, these deposited layers have a porosity between 20 and 60% with respect to the volume of each of the layers, preferably between 20 and 40% with respect to the volume of each of the layers, made up of pores with an average size between, preferably, 0.1 and 5 μm, and a thickness in each layer of between 5 and 100 μm, preferably between 20 and 60 μm. Optionally, and preferably, a final heat treatment stage can be carried out on the final membrane after the deposition of all the layers at temperatures between 65° and 1500° C. In the final membrane, the particles that form the porous structure of the membrane (a membrane, even if it is a dense membrane, has or can have a porous structure, since-if present—layers (iii), (iv) and (v) are porous) may have an average grain size preferably between 0.05 and 2.0 μm, and the membrane may have a thickness of between 20 and 60 μm after sintering heat treatment. All deposited layers need to be subjected to at least one heat treatment. Said treatment depends on the type of furnace, the load and the size and geometry of the membrane, as well as the layer to be sintered (for example, normally layer (iii) is heated to 1000° C., while the functional layers are brought to higher temperatures).

According to particular embodiments, layer (iii) is applied after having sintered the rest of the membrane, and its layers, at the maximum temperature. Therefore, the sintering temperature of layer (iii) is usually substantially lower than the maximum sintering temperature of layer (ii).

According to the method of the invention, the liquid component of the inks, for any of the layers, can be selected from water, glycol, glycol ether, aliphatic solvents (for example, esters with a carbon number greater than 10 (preferably between 10 and 35) and combinations thereof, and is preferably water.

The liquid component of the inks is present in a percentage by weight between 15 and 80%, preferably between 25% and 70% with respect to the total weight of the ink.

According to the method of the invention, the ink conditioning additives, which comprise dispersants, preservatives, binders, surfactants and/or combinations thereof, are present in a weight percentage between 0.5 and 25%, preferably between 2 and 20% with respect to the total ink.

According to the present invention, in the case of dense ionic ceramic membranes, there may be an additional step in the method for the preparation of porous layers (iii), (iv) and (v), which improves their functionality. According to a possible embodiment, the method for obtaining the catalytic activation layer (iii) may comprise at least one stage of incorporation-after stage c)—of a catalyst on the surface of the particles of the porous layer previously prepared, preferably prepared by using inkjet. The deposition is done by immersing the final membrane, already sintered (after the thermal treatment(s)) in a solution with a precursor, which accesses all the porous layers (so that the catalyst would remain included in all the porous layers). The catalyst is introduced by means of a technique selected from impregnation or infiltration of liquid solutions of the metals precursors comprised in the final catalyst composition; infiltration of a dispersion of nanoparticles of the catalyst; vapor phase deposition by PVD or CVD techniques and combinations thereof.

This catalyst incorporation step can be carried out in 2 steps, that is, introducing a first element (metal), and then, consecutively, other metals or combinations of them using the techniques stated in the previous paragraph. It is common practice to carry out a thermal drying treatment (T between 100-200° C., between 0.5-8 h) after the incorporation of the first element and before the incorporation of the second. Doing it in 2 steps may be advantageous in some cases since it may allow the surface of the nanoparticles of the compound based on the first element to be preferentially modified or promoted without producing any effect inside said nanoparticles. In addition, according to a particular embodiment, the method for obtaining a catalytic activation layer may also comprise a second stage of heat treatment at temperatures between 45° and 1100° C. This is another heat treatment specific to this catalytic activation. The atmosphere can vary between air, inert or $H_2$ and the time between 0.5 and 36 h.

The application of the different layers requires sintered thicknesses of the order of 30 μm, that is, 6 times greater than those currently applied for the decoration of ceramic tiles (FIG. 6). Said thickness determines the type of liquid component that can be used, avoiding solvents with very slow evaporation and very high decomposition temperatures, which cause long drying times for the piece and the appearance of defects in the sintered layer. For this reason, in a preferred embodiment, the inks applied by inkjet printing technology are formulated using water, glycols, glycol ether or combinations of both as liquid components, since they are miscible.

By way of example, the composition of the ceramic membranes can be as follows:

(a) Dense ionic ceramic membranes for oxygen separation. Any of the porous and dense layers that make up the ceramic $O_2$ separation membranes can be made up of at least mixtures of particles that have two different compositions and crystalline phases (mixed ionic conducting composites):

a.1) a first phase that It is composed of zirconium oxide or cerium oxide, partially substituted-zirconium or cerium-, preferably, between 10-30 mol %, by at least one element selected from Y, Se, Gd, Pr, Sm, Nd, Er, Tb and combinations thereof, preferably, Y, Gd, Sm, Tb and combinations thereof, said first phase has a fluorite-type crystalline structure, and has an ionic conductivity greater than 0.001 S/cm at 850° C.; a.2) a second phase comprising a mixed oxide with a spinel-type structure, comprising at least one element selected from Fe, Ni, Co, Al, Cr, Mn and combinations thereof, preferably, Fe, Ni, Co, Mn and combinations thereof, and has a total conductivity greater than 0.05 S/cm at 850° C.

Another example of membranes for the same application:

(b) (dense ionic ceramic membranes for oxygen separation), each of the porous and dense layers can be formed at least by mixtures of particles that have two different compositions and crystalline phases:

b.1) a first phase comprising zirconium oxide or cerium oxide, partially substituted (10-30 molar %) cerium or zirconium, by at least one element selected from Y, Se, Gd, Pr, Sm, Nd, Er, Tb and combinations thereof, preferably, Y, Gd, Sm, Tb and combinations thereof, said first phase has a fluorite-type crystalline structure, and has an ionic conductivity greater than 0.001 S/cm at 850° C.;

b.2) a second phase comprising a mixed oxide with a perovskite-type structure, comprising at least one metal selected from lanthanides, Fe, Ni, Co, Cr, Mn and combinations thereof, preferably from Fe, Mn and combinations thereof, and has a total conductivity greater than 0.05 S/cm at 850° C.

Composites can also be used in the constituent layers of ceramic $H_2$ separation membranes. An example of membrane separation of $H_2$ is, such as it is pointed out in the particular embodiment of application (c) (dense ionic ceramic membrane for hydrogen separation):

c.1) a first phase comprising barium cerate or zirconate doped (15-20 mol %) by at least one element selected from Gd, Y, Eu, Yb and combinations thereof and has a perovskite-type crystalline structure and a proton conductivity greater than 0.01 S/cm at 600° C., c.2) a second phase comprising an oxide of cerium or zirconium, partially substituted (10-30% molar) by at least one element selected from Y, Gd, Sm and combinations of both, and has a fluorite-type crystalline structure, and has a total conductivity greater than 0.05 S/cm under operating conditions.

The high resolution of inkjet technology makes it possible to make patterns with different inks, with different materials that confer specific functions, or mixtures of inks, which allow progressive fadings to be made, for example, in order to achieve selectivities for different products in a single integrated way, and/or maximize permeability, respectively. These fadings are obtained after one or more applications of the inks. These applications (or passes) can be identical applications (same drawing or pattern) obtaining 2D patterns (see FIG. 8) or they can be several different applications, thus obtaining 3D patterns (see FIG. 9) and thanks to the different crystalline phases and/or porosity of the layers where they are applied. These patterns achieve that the permeation of the membranes to be greater since it maximizes the ambipolar conductivity of the membrane as a whole.

For example, for oxygen membranes based on mixed ion-conducting composites, in the functional layer of dense separation, (ii), it is possible to make patterns that maximize the amount of the ion-conducting phase (which finally determines the total permeability), ensuring at the same time, the connectivity and good distribution of the electronic conductive phase, such that the total permeability is optimized. FIG. 8.*a* shows a pattern wherein, on an ink matrix composed of an ionic conductor (e.g., $Ce_{0.9}Gd_{0.2}O_{1.95}$) lines have been drawn with an electronic conductor ink (e.g. $La_{0.85}Sr_{0.15}MnO_3$). In the same way, it would be possible to make other types of traces on the ionic conductive matrix, such as grids, segments (*Journal of Membrane Science*, 486 (2015) 222-228), mosaics, spirals and/or individual pillars with the electronic or conductive ink, or with mixtures of the two inks, in such a way as to guarantee the continuity of both phases and, therefore, the ionic and electronic exchange. This same type of pattern can be made in the rest of the layers that make up the membrane.

Another type of example for these membranes is the possibility of achieving ink distributions that give rise to patterns and/or fadings according to the intended use of the membranes. A particular embodiment comprises the deposition in certain areas of two or more different ionic conductors, such as, for example, a preferred conductor of the oxygen ion and a preferred conductor of the proton, in a chessboard-type distribution of inks (FIG. 8.*b*), or fractals (FIG. 8.*c*). The following conductors or type of selective material can be combined (normally there are two or three in the same membrane):

Oxygen ion conductor, proton conductor, carbonate ion conductor, alkali metal conductor Electronic conductor type n or p Non-oxidic ceramics (e.g. titanium nitrides) or hydrogen permeable alloys (e.g. Pd, V, Nb, Ta alloys)

Ceramic porous matrices (after layer sintering) with selectivity to: $H_2$, CO, $CO_2$, water, methane or certain hydrocarbons (defines, paraffins, aromatics, etc.).

This type of combination allows the mixed selectivity of the separating membranes to be precisely adjusted, allowing a distribution of the type of conductor or selective material along the membrane to adapt it to the needs of the method, for example, in membrane reactors wherein the injection/gas extraction must be adjusted along the length of it.

Examples of Volume Resolution of the 3D Layer

Due to the fact that the inkjet technique is a layer-by-layer deposition system, a different type of pattern can be made in each one of the ink applications (that is, in each "pass" of the injection heads). In this way, it is possible to manufacture very well-defined multilayer structures in micrometric 3D layers, to obtain fine-tuned conduction properties in the solid state or diffusion through porous media. FIG. 9 shows an example of multilayer pyramidal compositional architecture, made with different applications ("passes") of the ink heads, which can be achieved by modifying the design pattern in each of the applied layers.

The existing technology and inkjet heads allow obtaining layers with a thickness after firing between 3 and 15 μm for each "pass" with a maximum resolution of 400*1800 dpi.

The same type of strategy can be used to adjust the porosity characteristics with lateral resolution (2D-XY) or in depth (3D-z), such that in the layers (iii, iv and v) fadings can be made (in cross-sections of the membrane) and with specific variations in the 2D planes.

This type of 3D structure by sequential deposition of layers with different patterns (drawings) of inks, allows adjusting the composition of the surfaces in the volume, in such a way that the composition of the membrane is defined (progressively) depending on the gases or conditions present on both sides of the membrane. The purpose of this can be variable, for example, to improve permeability to different gases or selectivity, to improve stability, to adjust catalytic properties, to avoid pore blockage or irreversible adsorption or selective promotion of n- or p-type electronic conductivity.

Throughout the description and claims the word "comprise" and its variants are not intended to exclude other technical characteristics, additives, components or steps. Other objects, advantages and features of the invention will be apparent to those skilled in the art in part from the description and in part from the practice of the invention.

With the method of the invention mixed conductivity membranes are achieved (based on ionic conductors) and the permeability of the membrane is considerably increased with respect to known membranes. This is achieved because with the inkjet technique it is possible to make layers that achieve these functionalities in 2D and 3D.

BRIEF DESCRIPTION OF THE FIGURES

FIG. 3 shows a simplified representation of a membrane with:

Figure 4:
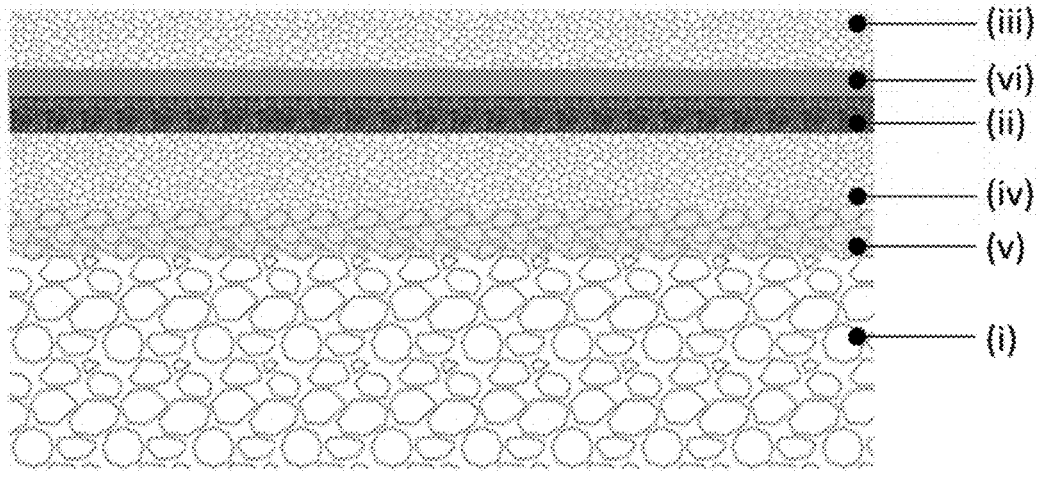
Figure 5:
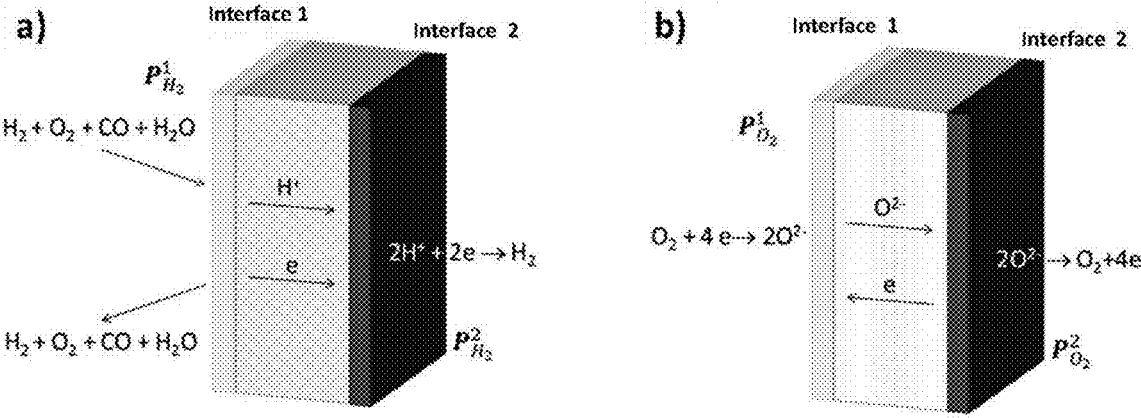
Figure 6:
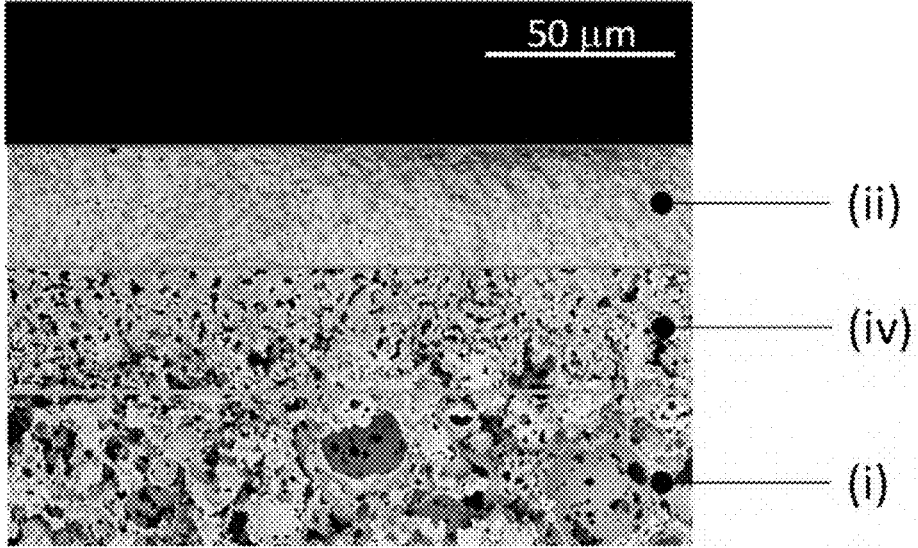
Figure 7:
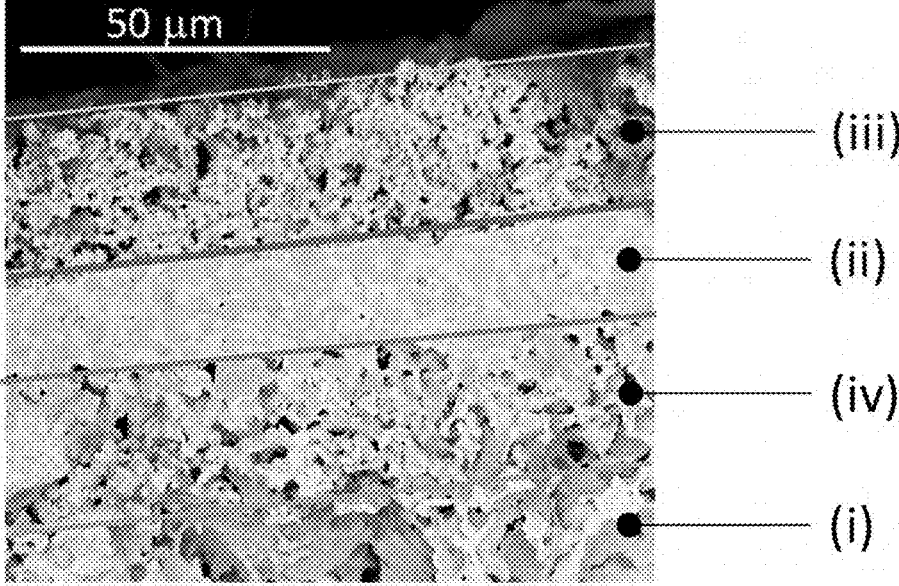
Figure 8:
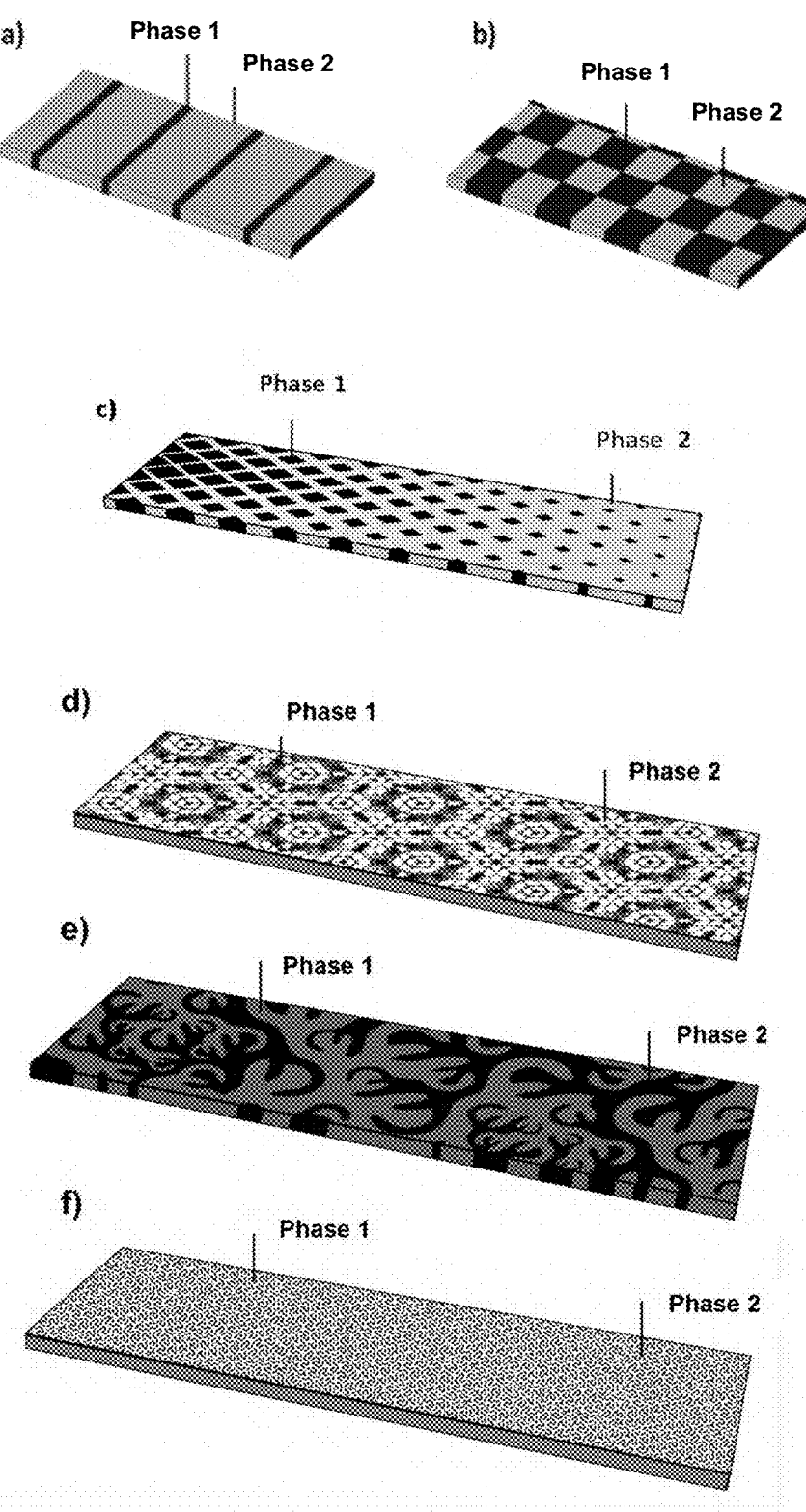
Figure 9:
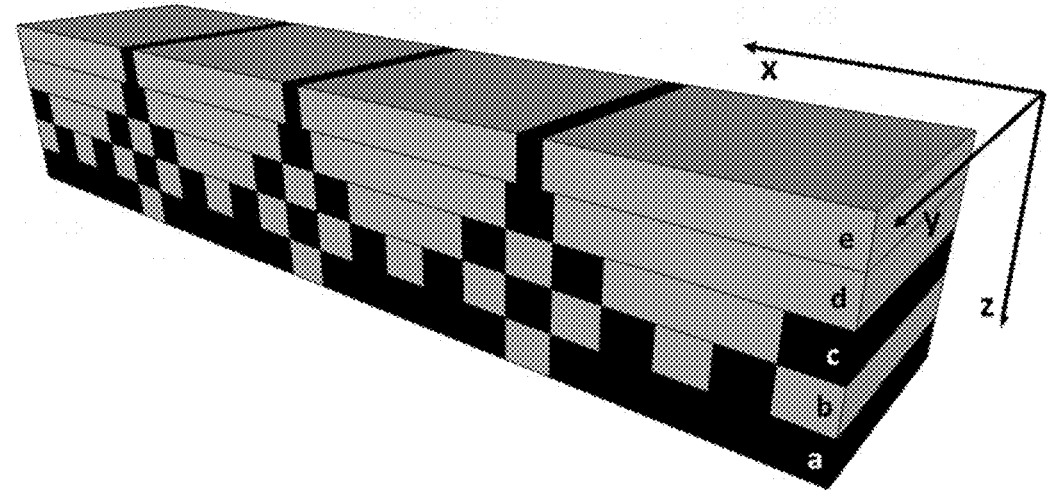
Figure 10:
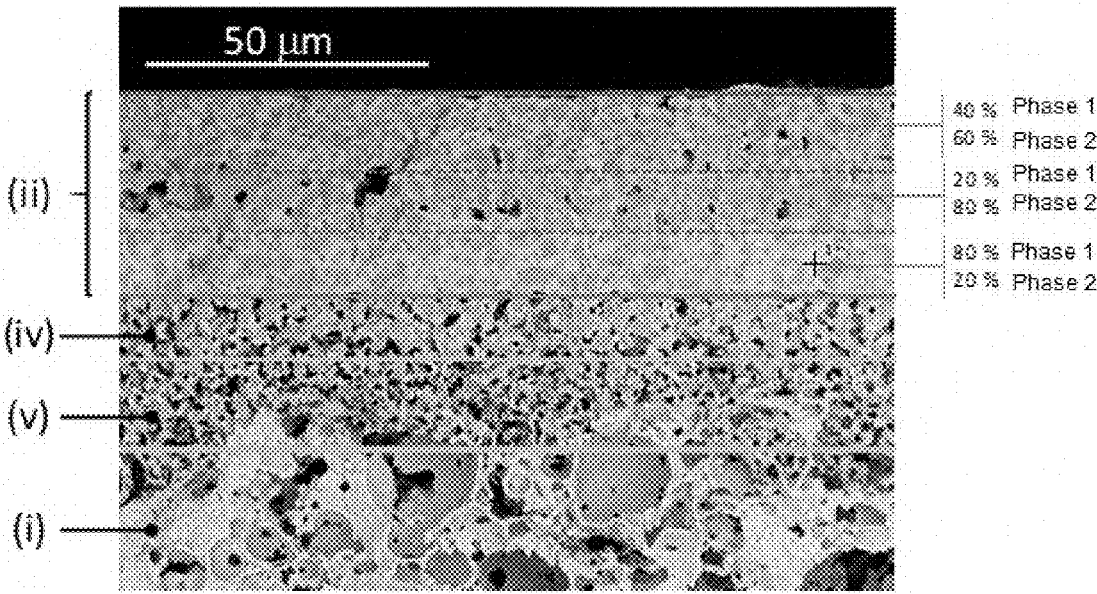
Figure 11:
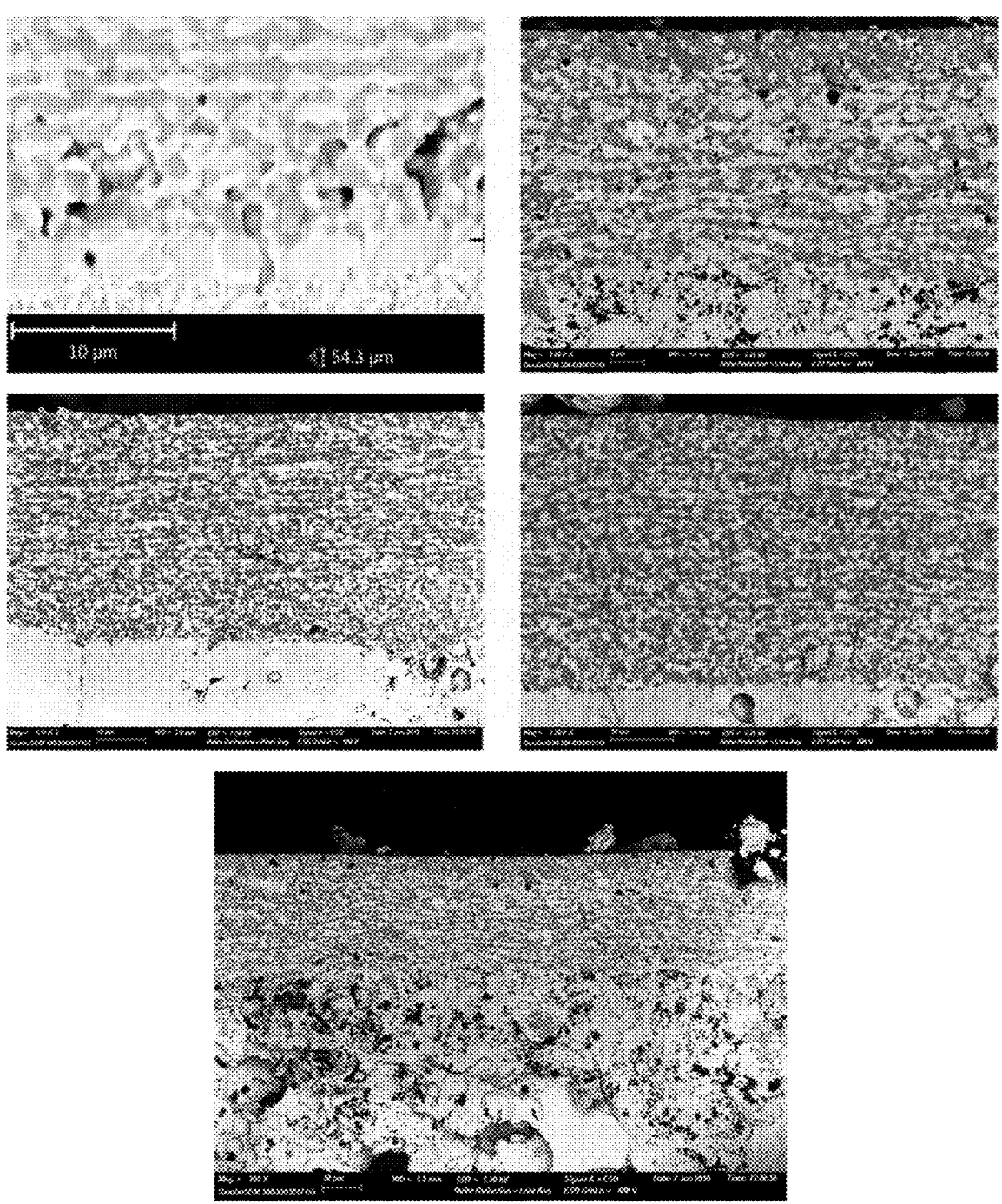

(i) a porous support, (v) a porous compositional damping interlayer, (iv) a porous catalytic layer, (ii) a non-porous functional separation layer, and (iii) an upper catalytic activation layer;

FIG. 4 shows a schematic of a membrane in which the architecture and sequence between (i), (ii), (iii), (iv), (v) and (vi) are presented;

FIG. 5 shows a) representation of the separation of hydrogen through dense membranes based on ceramics capable of transporting protons and electron carriers at high temperature, b) representation of the separation of oxygen through dense membranes based on ceramics capable of transport of oxygen ions and electron carriers at high temperature;

FIG. 6 shows a scanning electron microscope image of a cross-section of an oxygen-permeable ceramic membrane exhibiting (i) a porous support, (iv) a porous catalytic layer, (ii) a non-porous functional separation layer;

FIG. 7 shows a scanning electron microscopy image of a ceramic membrane permeable to oxygen that presents components (i), (ii), (iii) and (iv), the last three layers being made up of a material composed of two crystalline phases, one that conducts mainly oxygen ions and another that conducts mainly electron carriers;

FIG. 8 shows design examples of functional layers made with inkjet printing technology (inkjet. a) Electric conductive lines on ionic conductive matrix; b) Arrangement in a chessboard form of different mixed conductors; c-d-e-f) Fractal arrangement of different mixed conductors;

FIG. 9 shows an example of multilayer design with pyramidal 3D architecture;

FIG. 10 shows scanning electron microscope image of a cross section of an oxygen-permeable ionic ceramic membrane prepared by inkjet technology, showing a 3-stage fading of the dense functional layer (ii) obtained by mixing two different crystalline phases; and FIG. 11 shows scanning electron microscope images of a cross section of an oxygen-permeable ionic ceramic membrane prepared by inkjet technology, wherein a 3D pattern is observed in the location of the grains of two different crystalline phases (spinel and fluorite) along of the axis parallel to the printing plane.

The present invention is illustrated by the following examples which are not intended to be limiting thereof.

DETAILED DESCRIPTION OF THE INVENTION

The various features and advantageous details of the subject matter disclosed herein are explained more fully with reference to the non-limiting embodiments described in detail in the following description.

EXAMPLES

Example 1

Preparation of Materials and Inks

On a porous advanced ceramic (porous support (i) of yttrium-doped zirconium oxide with a PMMA pore former that has undergone a heat treatment of 1000° C. (2 h), ramp 1° C./min), which acts as a support for the membrane and does not present catalytic activity, inks T1 and T2 have been deposited, which originate the porous (iv) and dense (ii) layers after sintering, respectively. Both printable inks are obtained from the combination of three inks (A, B and C).

The liquid components used for inks A, B and C have been water and long chain glycol. As conditioning agents (dispersants, preservatives, binders, surfactants, etc.) a system of specific additives for water-based work has been used, which made it possible to regulate the properties of the ink, facilitating its application in high thicknesses (required for the application) without adherence defects to the substrate, cracks or formation of surface irregularities, achieving uniform and smooth layers on the ceramic support.

As examples of dispersants or mixtures thereof, there are on the market, produced and distributed by LUBRIZOL, such as Solsperse 13940, Solsperse 36000, Solsperse 32500, Solsperse 28000, Solsperse 19000, Solsperse 16000, Solsperse 39000 or their respective assigned codispersants such as Solsperse 22000 and 5000.

Other additives: glycols such as diethylene glycol, glycerin, 1,4-butanediol, 1,4-cyclohexanedimethanol, 1,5-pentanediol, 1,6-hexanediol, polycarboxylic acids Preservative: they can be antioxidants such as ascorbic acid.

Examples of binders: emulsified polymers such as butyl (meth)acrylate, 2-ethylhexyl (meth)acrylate, decyl (meth) acrylate, lauryl (meth)acrylate, stearyl (meth)acrylate, hydroxyethyl (meth)acrylate, hydroxypropyl (meth)acrylate and polyglycols, triethanolamine, methylpyrrolidone, polyvinylpyrrolidone.

Conventional surfactants: anionic and/or nonionic emulsifiers such as, for example, ammonium or alkali metal salts of alkyl, aryl, alkylaryl sulfates, sulfonates or phosphates; alkyl sulfonic acids; sulfosuccinate salts; fatty acids; ethylenically unsaturated surface active monomers, and ethoxylated alcohols or phenols.

Antifoams can be, for example, block copolymers based on ethylene and propylene oxide, e.g. Pluronic 127, Pluronic 123, Pluronic L61.

The composition of each of the inks A, B and C is as follows:

Ink A has in composition an organic solid with a high specific surface area, the composition being as follows:

TABLE 1

| Ink A | Weight percentage with respect to the total weight of the ink |
|---|---|
| Organic Solid (PMMA) | 10-30 |
| Water | 15-35 |
| Glycols PEG 200 (polyethylene glycol 200), DEG(diethylene glycol) | 15-35 |
| Dispersant: Acrylic polymer | 2-20 |
| Defoamer: Polymers and copolymers of alkoxanes | 0.1-2 |
| Surfactant: Siloxane modified with polyether | 0.05-2 |
| Preservative: Isothiazolone derivatives solution | 0.01-0.05 |

Ink B has a high-density ceramic oxide as its composition, its composition being as follows:

TABLE 2

| Ink B | Weight percentage with respect to the total weight of the ink |
|---|---|
| Ceramic oxide | 30-45 |
| Glycols | 15-35 |
| Water | 15-35 |
| Dispersant: Acrylic polymer | 1-20 |
| Defoamer: Polymers and copolymers of alkoxanes | 0.1-2 |
| Surfactant: Siloxane modified with polyether | 0.05-2 |
| Preservative: Isothiazolone derivatives solution | 0.01-0.05 |

Finally, ink C has in composition a pigment based on metal oxides-electronic conductive crystalline phase—of low density, its composition being as follows:

TABLE 3

| Ink C | Weight percentage with respect to the total weight of the ink |
|---|---|
| Pigment | 30-45 |
| Glycols PEG 200 (polyethylene glycol 200), DEG (diethylene glyco) | 15-35 |
| Water | 15-35 |
| Dispersant: Acrylic polymer | 1-20 |
| Defoamer: Polymers and copolymers of alkoxanes | 0.1-2 |
| Surfactant: Siloxane modified with polyether | 0.05-2 |
| Preservative: Isothiazolone derivatives solution | 0.01-0.05 |

Each of these inks has been prepared using a microball mill commonly used in the manufacture of inkjet inks. To obtain the catalytic inks T1 and T2, the established amount of each of the preparations A, B and C has been dosed, in the percentages shown in Table 4, and an integration and homogenization process has been carried out (for example, agitation and grinding with ceramic micro-balls).

TABLE 4

| Percentage by weight of the preparations that constitute the catalytic inks | | | |
|---|---|---|---|
| Catalitic ink | A | B | C |
| T1- porous catalitic layer (iv) | 15-25 | 15-25 | 45-60 |
| T2-dense functional separation (ii) | — | 20-30 | 70-80 |

Below, Table 5 specifies the approximate composition of both functional inks, as well as their main characteristics:

TABLE 5

| Composition and properties of catalytic inks T1 and T2 | |
|---|---|
| COMPOSITION | |
| Solid content | 25-45% respect to the total weight of the composition |
| Liquid content | 25-70% |
| Aditive content | 2-20% |
| PROPERTIES | |
| Density | 1.15-1.40 g/cm$^3$ |
| Viscosity under Shot Conditions (rheometer) | 13-18 cP |
| Particle size $D_{99}$ | 0.8-1.5 μm |
| Surface tension | 26-33 mN/m |

Inkjet Application of the Functional Layers:

The prepared inks were deposited on flat supports made of advanced zirconium oxide ceramics doped with 3% molar of yttrium oxide that have high porosity (40%) and permeability to the passage of gases as a result of the combustion of the fugitive agent (microspheres of PMMA) present in the formulation in a previous thermal treatment at 1100° C.

These inks can be applied with different piezoelectric heads designed to support water as the main solvent, such as Dimatix 1024 M, L, HF, PQRL. Also the new heads from Seiko and Kiocera are suitable for these inks.

In this way it is possible to apply an amount of ink around 100 gr/m$^2$ per head bar.

Taking into account that currently both, single pass machines and plotters, can install up to 12 bars, it is possible to get an idea of the amount of ink that can be downloaded.

Example 2

Deposition Process (Machinery, Heads, Deposition Parameters, Passes, Etc.)

First, the T1 ink was applied to the available ceramic substrate using a Dimatix HF head. In total, 225 g/m$^2$ were applied, for which it was necessary to make a total of 3 passes of 75 g/m$^2$ each.

Next, a total of 375 g/m$^2$ of T2 ink was applied, for which it was necessary to make a total of passes of 75 g/m$^2$ each. After a drying process at 100° C., a heat treatment is carried out at 1450° C., obtaining a sintered membrane, which was finally deposited using T1 ink (to obtain the catalytic layer (iii)) and after a drying, it is sintered at 1100° C.

Example 3

Figure 1:
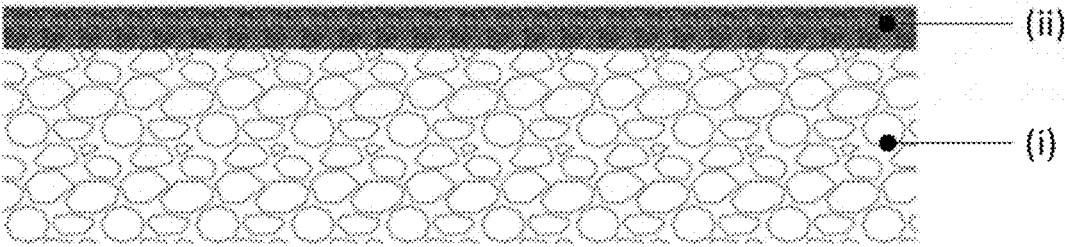
FIG. 1 shows a simplified representation of a membrane with: (i) a porous support, (ii) a separating functional separation layer.
Figure 2:
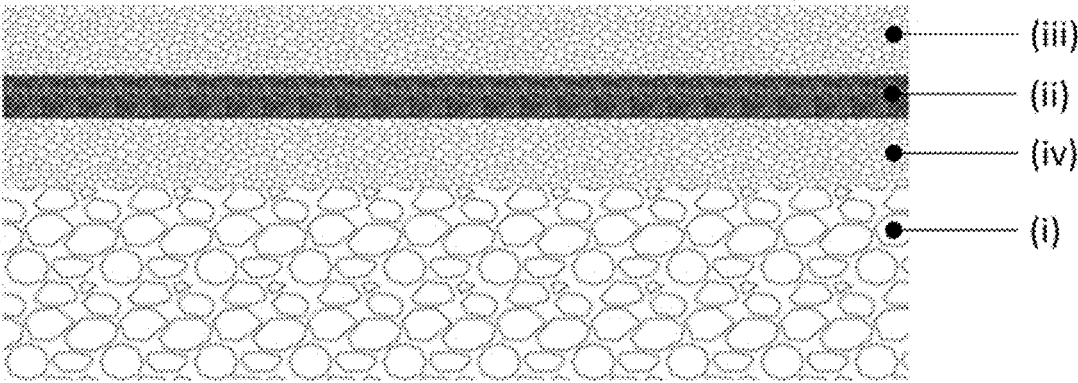
FIG. 2 shows a simplified representation of a membrane with (i) a porous support, (iv) an intermediate porous catalytic layer, (ii) a separating functional layer and (iii) an upper porous catalytic activation layer.
Figure 3:
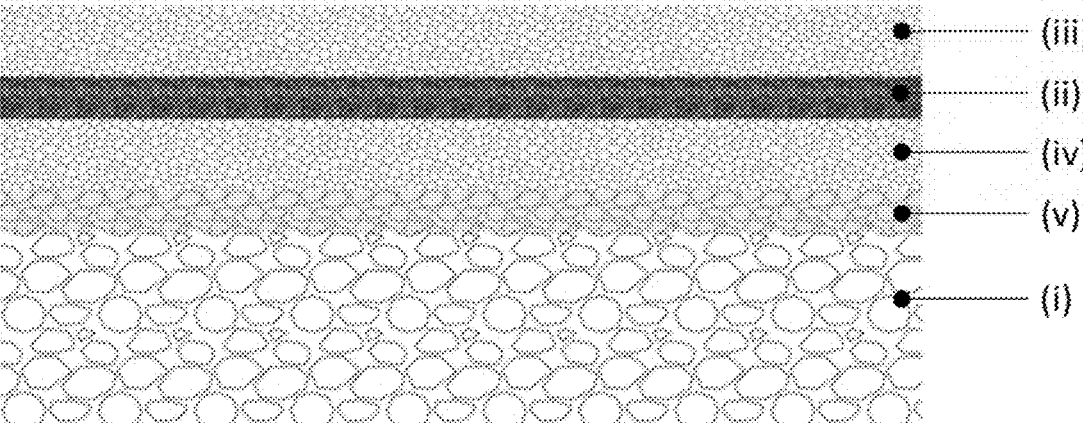

Sample prepared in the same way as that described in example 2, but to which an aqueous solution of Pr and Ce nitrate, 1M, was infiltrated into the porous substrate. The membrane obtained is in accordance with the present invention and has a porous support (i), a functional non-porous separation layer about 100 μm thick (ii) and an upper porous catalytic activation layer (iii), according to the scheme shown in FIG. 2.

To evaluate the oxygen separation properties of the compounds under study, an experimental set-up made of quartz is available, in which one can analyze the behavior of different ceramic membranes.

The quartz assembly consists of a tube with two chambers separated by a ceramic membrane, with no point of communication between the two chambers due to the density (absence of porosity) of the membrane and the sealing made with O-rings.

On one side an oxygen-rich stream is fed, while on the other side a carrier gas is circulated or a vacuum is induced. This difference in oxygen content conditions serves as the driving force for oxygen diffusion to occur from the feed-reject side towards the permeate side. Using a gas chromatograph to quantify the oxygen content in the permeate stream, the flow of oxygen that permeates through the membrane under different conditions is determined, oxygen content in the feed chamber and aggressive atmospheres in the permeate (presence of $CO_2$ and $SO_2$).

Oxygen permeation was studied on the membrane described above. Permeation tests and catalytic studies were carried out on disc-shaped membranes with a diameter of 15 mm and a thickness of approximately 1 mm. The reaction temperature is controlled by a thermocouple close to the membrane. The permeate gas stream was analyzed using a Varian CP-4900 micro-CG equipped with three analysis modules: Molsieve5A, PoraPlot-Q and CP-Sil.

Table 6 shows the oxygen permeation obtained in milliliters (normal conditions) per minute and square centimeter (Nml·min$^{-1}$·cm$^{-2}$) as a function of temperature. The results show that the membrane according to the present invention has a much higher oxygen permeation than a membrane prepared by uniaxial pressing of the same composition as layer (ii) of the membrane prepared according to the present invention and sintered at 1450° C.

TABLE 6

| Example | 950° C. | 900° C. | 850° C. | 800° C. | 700° C. |
|---|---|---|---|---|---|
| Ink jet | — | — | 0.45 | 0.2 | 0.075 |
| Conventional monolitic | 0.016 | 0.005 | 0.008 | — | — |

The invention claimed is:

1. A method for the manufacture of ceramic gas separation membranes that comprises:

deposition on a porous support (i), by means of an inkjet printer, of at least one functional separation layer (ii) comprising at least two inks, at least one thermal treatment, which produces sintering of the functional separation layer (ii), and deposition of at least one porous catalytic activation layer (iii) on the functional separation layer (ii).

2. The method according to claim 1, comprising at least the following steps:

(a) forming of a porous support (i); compatible with the functional separation layer (ii), (b) deposition on the porous support (i), by means of the inkjet printer, of at least one functional separation layer (ii) made up of at least two inks and deposition of at least one porous layer of catalytic activation (iii) on the functional separation layer (ii) and (c) at least one thermal treatment, which produces sintering, wherein the functional separation layer (ii) is deposited in a way that gives rise to a surface:

with fadings, or with patterns, or with combinations of both.

3. The method according to claim 2, comprising applying:

a porous catalytic layer (iv), between the porous support (i) and the functional separation layer (ii), a compositional damping porous interlayer (v), between the porous support (i) and the catalytic porous layer (iv), and an additional non-porous layer (vi) of protection-between the functional separation layer (ii) and the porous catalytic activation layer (iii), using a technique selected from dip coating, spin coating, roller coating or screen printing; physical vapor deposition, sputtering, electron beam, atomizing; airbrushing; spraying of suspensions; and/or thermal projection (thermal spraying), including plasma spraying and spray pyrolysis, 3D printing, stereolithography, injection, inkjet printing and combinations thereof.

4. The method according to claim 1, further comprising a step, wherein a porous catalytic layer (iv) located between the porous support (i) and the functional separation layer (ii) is deposited.

5. The method according to claim 4, further comprising a step wherein a porous compositional damping interlayer (v) is deposited between the porous support (i) and a porous catalytic layer (iv).

6. The method according to claim 5, further comprising the deposition of an additional non-porous layer (vi) of protection between the functional separation layer (ii) and a porous catalytic activation layer (iii).

7. The method according to claim 6, wherein a set of inks that give rise to the additional non-porous layer (vi) comprises at least:

a) an inorganic solid, b) a liquid component and c) a conditioning additive.

8. The method according to claim 6 wherein layers (iv), (v) and each of the layers (ii), (iii), and (vi), after sintering, comprises at least 2 different inorganic crystalline phases, selected from the group consisting of fluorite, perovskite, spinel, pyrochlore and combinations thereof.

9. The method according to claim 6 comprising generating a fading or a pattern after an application or identical applications, in layers (ii), (iii) and (vi) after a thermal treatment, that has:

a distribution in a crystalline phase with regard to layers (ii) and (vi), a distribution in the crystalline phase with regard to layer (iii), a porosity distribution with regard to layer (iii), or the distribution in the crystalline phase and the porosity distribution with regard to layer (iii)

selected from the group consisting of 2D chessboard, mosaic with interconnectivity of phases in section, fractal pattern, spiral pattern and combinations thereof.

10. The method for the manufacture of ceramic gas separation membranes, according to claim 6, wherein a fading or a pattern that is generated, after more than one application with a different pattern, in layers (ii) and (iii), after heat treatment, is a fading with 3D architectures selected from the group consisting of conical, pyramidal, spiral and combinations of them.

11. The method according to claim 6 comprising generating a fading or a pattern after an application or identical applications, in layers (ii), (iii), (iv) and (vi) after a thermal treatment that has:

a distribution in a crystalline phase with regard to layers (ii) and (vi), a distribution in the crystalline phase with regard to layer (iii) and (iv), a porosity distribution with regard to layer (iii) and (iv), or the distribution in the crystalline phase and the porosity distribution with regard to layer (iii) and (iv) selected from the group consisting of 2D chessboard, mosaic with interconnectivity of phases in section, fractal pattern, spiral pattern and combinations thereof.

12. The method according to claim 6 comprising generating a fading or a pattern after an application or identical applications, in layers (ii), (iii), (v) and (vi) after a thermal treatment that has:

a distribution in the crystalline phase with regard to layers (ii) and (vi), a distribution in the crystalline phase with regard to layer (iii) and (v), a porosity distribution with regard to layer (iii) and (v), or the distribution in the crystalline phase and the porosity distribution with regard to layer (iii) and (v)

selected from the group consisting of 2D chessboard, mosaic with interconnectivity of phases in section, fractal pattern, spiral pattern and combinations thereof.

13. The method according to claim 6, wherein a fading or pattern that is generated, after more than one application with a different pattern, in layers (ii), (iii) and (iv), after heat treatment, is a fading with 3D architectures selected from the group consisting of conical, pyramidal, spiral and combinations of them.

14. The method for the manufacture of ceramic gas separation membranes, according to claim 6, wherein a fading or pattern that is generated, after more than one application with a different pattern, in layers (ii), (iii) and (v), after heat treatment, is a fading with 3D architectures selected from the group consisting of conical, pyramidal, spiral and combinations of them.

15. The method according to claim 5 wherein a set of inks that give rise to layers (iii), (iv) and (v) is composed of at least:

(a) an inorganic solid (b) a fugitive additive, (c) a liquid component, and (d) a conditioning additive;

wherein components (c) and (d) are always present in the formulation of each of the constituent inks, while components (a) and (b) can both be present at the same time, or only one of them.

16. The method according to claim 5, wherein the porosity of layers (iii), (iv) and (v) is between 20 and 60% with respect to the total volume of the layer and the thickness of each layer is between 5 and 100 μm.

17. The method according to claim 1, wherein a shaping of the porous support (i) is carried out by a technique selected from uniaxial or isostatic pressing, extrusion or calendering, tape casting, casting, dip coating, spin coating, roller coating or screen printing, physical vapor deposition, sputtering, electron beam, suspension spraying, and/or thermal projection (thermal spraying), including plasma spraying and spray pyrolysis, 3D printing, stereolithography, injection, inkjet printing and combinations thereof.

18. The method according to claim, 1 wherein the porous support (i) comprises materials resistant to sintering temperatures and compatible with the materials of the functional separation layer (ii).

19. The method according to claim, 1 wherein the porous support (i) is constituted by materials that are selected from the group consisting of magnesium oxide, aluminum and magnesium spinels, cerium oxide doped with at least one lanthanide metal, zirconium oxide doped with at least one of the following elements: Y, Mg, Se or a lanthanide metal; titanium oxide, aluminum nitride, refractory alloys/superalloys, clay-based materials or silicates of aluminium, magnesium silicate, iron, titanium or alkaline or alkaline-earth elements, iron perovskites and combinations thereof.

20. The method according to claim 1, wherein the functional separation layer (ii) comprises inks that are composed of at least:

(a) an inorganic solid, (b) a liquid component, and (c) a conditioning additive.

21. The method according to claim 20, wherein the functional separation layer (ii) is a non-porous layer.

22. The method according to claim 20, wherein the inorganic solids are selected from the group consisting of solids that result in a minimum ionic conductivity of the sintered functional layer (ii) of 1 mS/cm and a minimum electronic conductivity of mS/cm at a temperature of 850° C.

23. The method according to claim 20, wherein the functional separation layer (ii) is a porous layer.

24. The method according to claim 1, wherein the functional separation layer (ii) has a thickness between 2 and 50 μm.

25. A ceramic membrane obtained by the method comprising:

deposition on a porous support (i), by means of an inkjet printer, of at least one functional separation layer (ii) comprising at least two inks and at least one thermal treatment, which produces sintering of the functional separation layer (ii) layer, and deposition of at least one porous catalytic activation layer (iii) on the functional separation layer (ii).

* * * * *